(12) United States Patent
Wong

(10) Patent No.: US 9,525,917 B2
(45) Date of Patent: Dec. 20, 2016

(54) AUTOMATIC COMMERCIAL PLAYBACK SYSTEM

(71) Applicant: TiVo Inc., Alviso, CA (US)

(72) Inventor: Kirk D. Wong, San Jose, CA (US)

(73) Assignee: TiVo Inc., San Jose, CA (US)

( * ) Notice: Subject to any disclaimer, the term of this patent is extended or adjusted under 35 U.S.C. 154(b) by 64 days.

(21) Appl. No.: 13/801,454

(22) Filed: Mar. 13, 2013

(65) Prior Publication Data

US 2013/0247091 A1    Sep. 19, 2013

Related U.S. Application Data

(60) Provisional application No. 61/610,382, filed on Mar. 13, 2012.

(51) Int. Cl.
*H04N 5/76* (2006.01)
*H04N 21/472* (2011.01)
(Continued)

(52) U.S. Cl.
CPC ........ *H04N 21/47217* (2013.01); *G06Q 30/02* (2013.01); *G11B 27/005* (2013.01);
(Continued)

(58) Field of Classification Search
None
See application file for complete search history.

(56) References Cited

U.S. PATENT DOCUMENTS

| 5,774,170 A | 6/1998 | Hite et al. |
| 7,873,261 B2 | 1/2011 | Tischer |
| (Continued) |

FOREIGN PATENT DOCUMENTS

| EP | 0851681 | 7/1998 |
| EP | 0 933 891 A2 | 8/1999 |
| (Continued) |

OTHER PUBLICATIONS

European Patent Office, "Search Report" in application No. 11 195 319.6-1908, dated Mar. 21, 2014, 7 pages.

(Continued)

*Primary Examiner* — Eileen Adams
(74) *Attorney, Agent, or Firm* — Wong & Rees LLP; Zhichong Gu

(57) ABSTRACT

While a multimedia device is fast-forwarding content, the multimedia device reads "jump back" tags expressed in or derived from a closed-caption stream. When the multimedia device detects the presence of a "jump back" tag while fast-forwarding, the multimedia device enters a special state. While in this special state, if the multimedia device detects that the user has instructed the multimedia device to stop fast-forwarding, the multimedia device locates a specified temporal location in a recorded commercial break. This specified temporal location may be specified by the particular tag, for example. The multimedia device stops performing whatever activity in which the multimedia device was engaged, "jumps back" to the specified temporal location in the recorded commercial break, and resumes playing the recorded content stream at normal speed from the specified temporal location.

20 Claims, 4 Drawing Sheets

(51) Int. Cl.
*G06Q 30/02* (2012.01)
*H04N 21/4147* (2011.01)
*H04N 21/81* (2011.01)
*H04N 21/845* (2011.01)
*H04N 21/858* (2011.01)
*G11B 27/30* (2006.01)
*G11B 27/00* (2006.01)

(52) U.S. Cl.
CPC ........... *G11B 27/3027* (2013.01); *H04N 5/76* (2013.01); *H04N 21/4147* (2013.01); *H04N 21/812* (2013.01); *H04N 21/8456* (2013.01); *H04N 21/858* (2013.01)

(56) References Cited

U.S. PATENT DOCUMENTS

| | | |
|---|---|---|
| 2003/0093790 A1 | 5/2003 | Logan et al. |
| 2003/0154128 A1 | 8/2003 | Liga et al. |
| 2003/0192060 A1 | 10/2003 | Levy |
| 2005/0226601 A1 | 10/2005 | Cohen et al. |
| 2007/0192786 A1* | 8/2007 | Takai ............... G06F 21/10 725/25 |
| 2007/0248314 A1 | 10/2007 | Iggulden |
| 2008/0089661 A1* | 4/2008 | Yamagishi ........... G11B 27/322 386/250 |
| 2009/0092374 A1 | 4/2009 | Kulas |
| 2009/0228492 A1 | 9/2009 | Valez et al. |
| 2010/0033624 A1* | 2/2010 | Smith ................ H04H 20/31 348/461 |
| 2010/0088716 A1 | 4/2010 | Ellanti |
| 2010/0303447 A1 | 12/2010 | Niemeijer et al. |
| 2011/0119698 A1* | 5/2011 | Paxton ............. H04N 7/17336 725/28 |
| 2013/0064524 A1* | 3/2013 | Griffin ............. H04N 21/2407 386/262 |

FOREIGN PATENT DOCUMENTS

| | | |
|---|---|---|
| EP | 1367588 | 12/2003 |
| JP | H02-071633 | 3/1990 |
| JP | H05-114194 | 5/1993 |
| JP | H05-182294 | 7/1993 |
| JP | H07-212331 | 8/1995 |
| JP | H07-322164 | 12/1995 |
| JP | H09-65267 | 3/1997 |
| JP | H09-135391 | 5/1997 |
| JP | H10-164521 | 6/1998 |
| JP | H10-208392 | 8/1998 |
| JP | H11-103452 | 4/1999 |
| JP | H11-187324 | 7/1999 |
| JP | H11-252473 | 9/1999 |
| JP | 2000-013755 | 1/2000 |
| JP | 2001-230996 | 8/2001 |
| JP | 2002-290878 | 10/2002 |
| JP | 2003-134436 | 5/2003 |
| JP | 2003-152707 | 5/2003 |
| JP | 2005-502279 | 1/2005 |
| JP | 2007-135033 | 5/2007 |
| JP | 2008-042333 | 2/2008 |
| JP | 2009-542089 | 11/2009 |
| JP | 2012-034022 | 2/2012 |
| WO | WO 98/07273 | 2/1998 |
| WO | WO 98/11723 | 3/1998 |
| WO | WO 98/17064 | 4/1998 |
| WO | WO 98/48566 | 10/1998 |
| WO | WO 99/38321 | 7/1999 |
| WO | WO0239450 | 5/2002 |
| WO | WO03021940 | 3/2003 |
| WO | WO 2005/079499 | 9/2005 |
| WO | WO2007149100 | 12/2007 |
| WO | WO2008124548 | 10/2008 |

OTHER PUBLICATIONS

Current Claims in application No. 11 195 319.6-1908, dated Mar. 2014, 2 pages.
PCT Search Report in application No. PCT/US13/30920, dated May 31, 2013, 12 pages.
Current Claims in application No. PCT/US13/30920, dated May 2012, 7 pages.
European Patent Office, Application No. 11195319.6, Pending Claims as of Jan. 26, 2015.
European Patent Office, Application No. 11195319.6, Summons to Oral Proceedings dated Jan. 26, 2015.
Japanese Patent Office, Application No. 2011-253349, Appeal Decision dated Feb. 10, 2015.
Japanese Patent Office, Application No. 2011-253349, Pending Claims as of Feb. 10, 2015.
Japanese Patent Office, Application No. 2013-156103, Foreign Office Action dated Jul. 8, 2014.
Japanese Patent Office, Application No. 2013-156103, Foreign Office Action dated Feb. 3, 2015.
Japanese Patent Office, Application No. 2013-156103, Pending Claims as of Jul. 8, 2014.
Japanese Patent Office, Application No. 2013-156103, Pending Claims as of Feb. 3, 2015.
Japanese Patent Office, Application No. 2014-004254, Foreign Office Action dated Jul. 8, 2014.
Japanese Patent Office, Application No. 2014-004254, Foreign Office Action dated Feb. 3, 2015.
Japanese Patent Office, Application No. 2014-004254, Pending Claims as of Jul. 8, 2014.
Japanese Patent Office, Application No. 2014-004254, Pending Claims as of Feb. 3, 2015.
European Patent Office, Application No. 07021582.7, Pending Claims as of Oct. 22, 2015.
European Patent Office, Application No. 07021582.7, Summons to Oral Proceedings dated Oct. 22, 2015.
European Patent Office, Application No. 13761144.8, Extended European Search Report dated Oct. 5, 2015.
European Patent Office, Application No. 13761144.8, Pending Claims as of Oct. 5, 2015.
Japanese Patent Office, Application No. 2015-500559, Foreign Office Action dated Dec. 8, 2015.
Japanese Patent Office, Application No. 2015-500559, Pending Claims as of Dec. 8, 2015.
European Patent Office, Application No. 07021582.7, Foreign Office Action dated Apr. 28, 2016.
European Patent Office, Application No. 07021582.7, Pending Claims as of Apr. 28, 2016.
European Patent Office, Application No. 07021583.5, Pending Claims as of Jun. 20, 2016.
European Patent Office, Application No. 07021583.5, Summons to Oral Proceedings dated Jun. 20, 2016.
Japanese Patent Office, Application No. 2015-500559, Foreign Office Action dated Jun. 14, 2016.
Japanese Patent Office, Application No. 2015-500559, Pending Claims as of Jun. 14, 2016.
Japanese Patent Office, Application No. 2015-113086, Foreign Office Action dated Jul. 19, 2016.
Japanese Patent Office, Application No. 2015-113086, Pending Claims as of Jul. 19, 2016.

* cited by examiner

AUTOMATIC COMMERCIAL PLAYBACK SYSTEM

CROSS-REFERENCE TO RELATED APPLICATIONS; BENEFIT CLAIM

This application claims priority to Provisional Patent Application No. 61/610,382 entitled Automatic Commercial Playback System, filed on Mar. 13, 2012, by Kirk D. Wong, the contents of which are incorporated herein by reference.

The present application is related to the following U.S. patent applications, each of which is incorporated by reference herein: U.S. patent application Ser. No. 09/665,921, titled "CLOSED CAPTION TAGGING SYSTEM," now issued as U.S. Pat. No. 7,889,964 B1; U.S. patent application Ser. No. 11/182,135, titled "SCHEDULING THE RECORDING OF A PROGRAM VIA AN ADVERTISEMENT IN THE BROADCAST STREAM," now issued as U.S. Pat. No. 7,986,868 B2; U.S. patent application Ser. No. 11/182,876, also titled "CLOSED CAPTION TAGGING SYSTEM," now issued as U.S. Pat. No. 8,036,514 B2; and U.S. patent application Ser. No. 11/473,543, titled "IN-BAND DATA RECOGNITION AND SYNCHRONIZATION SYSTEM," now issued as U.S. Pat. No. 7,661,121 B2.

FIELD OF THE INVENTION

Embodiments of the invention generally relate to multimedia device. Embodiments of the invention relate more specifically to techniques for automatically playing at least a part of an advertisement that a multimedia device user has fast-forwarded past.

BACKGROUND

The approaches described in this section could be pursued, but are not necessarily approaches that have been previously conceived or pursued. Therefore, unless otherwise indicated herein, the approaches described in this section are not necessarily prior art to the claims in this application and are not admitted to be prior art by inclusion in this section.

A majority of programs that are broadcasted on publicly accessible cable and television stations are divided into multiple separate program intervals that are separated by commercial breaks. Typically, a commercial break is of a limited duration that is less than the duration of the program intervals that precede and/or follow that commercial break. During the commercial break, the broadcaster that has been broadcasting the program broadcasts one or more advertisements (collectively called a "commercial pod"). These advertisements are not part of the program—such advertisements could be substituted with other advertisements without affecting the viewer's comprehension of the program in any way.

Typically, a multimedia device such as a digital video recorder (DVR) not only allows its user to play back content that the DVR has previously recorded (or is currently recording), but also allows its user to play back or fast-forward such content at greater than normal presentation speed. While the DVR is fast forwarding the content, the DVR skips over at least some frames of the content—frames that the DVR otherwise would have presented to the user if the DVR had been playing the content at normal speed. DVRs sometimes have the capability to fast forward content at different user-selected speeds, with more frames being skipped at faster speeds than at slower speeds. When a DVR fast forwards content at a significant speed, a user might be unable to comprehend with any clarity the content that the DVR is playing. Indeed, the user might not even desire to comprehend the content that the DVR is fast forwarding. Because users are often more interested in program content that occurs during program intervals than in advertisement content that occurs during the commercial breaks in between those program intervals, users often use a DVR's fast forwarding feature in an attempt to at least partially fast forward through commercial breaks so that the user does not need to spend time watching advertisements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
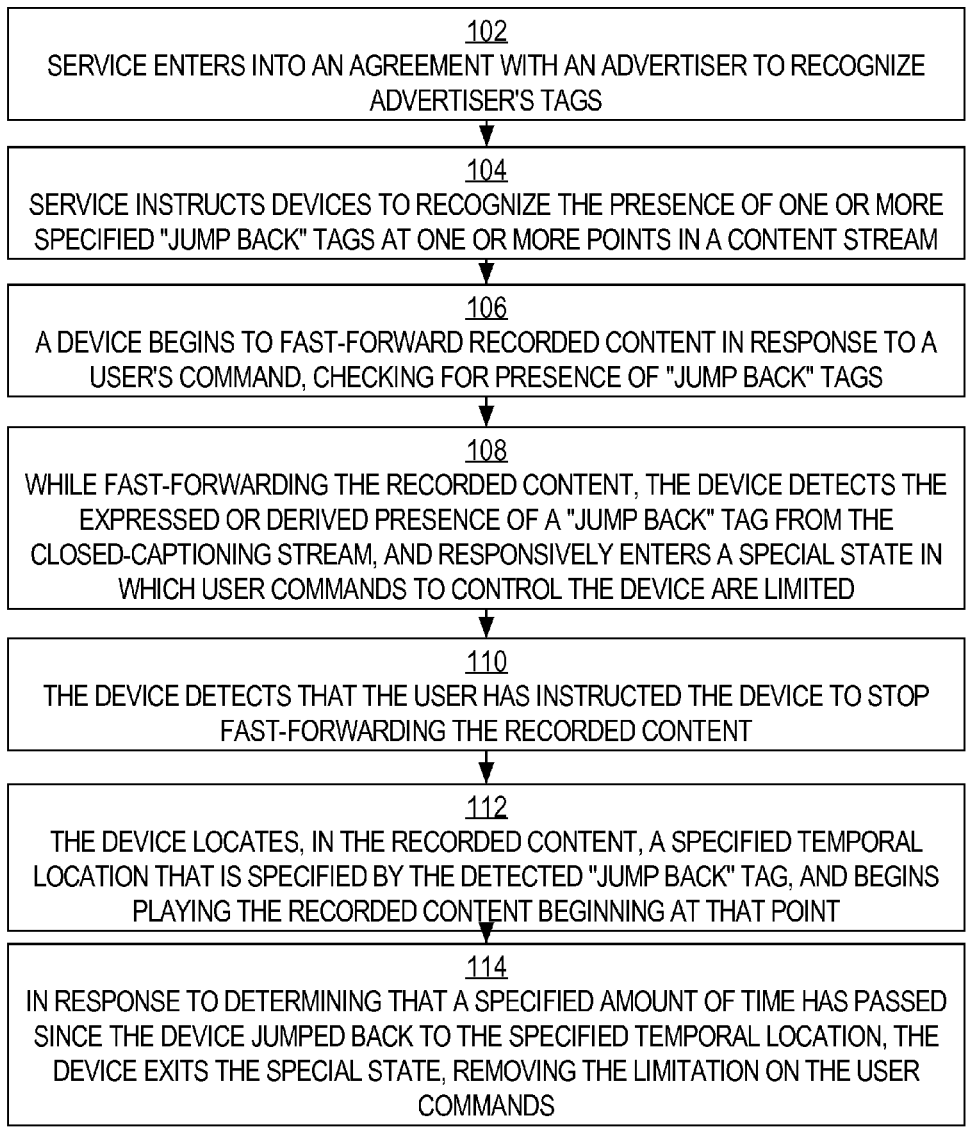
FIG. 1 is a flow diagram that illustrates an example of a technique for automatically playing a recorded advertisement beyond which a multimedia device has fast-forwarded, according to an embodiment of the invention.

A method and apparatus for automatically playing at least a part of an advertisement beyond which a user has fast-forwarded, using a multimedia device, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
 2.0 Structural Overview
 3.0 Playing a Skipped Advertisement
 4.0 Implementation Mechanisms—Hardware Overview
 5.0 Extensions and Alternatives 1.0 General Overview The needs identified in the foregoing Background, and other needs and objects that will become apparent for the following description, are achieved in the present invention, which comprises, in one aspect, a technique for automatically playing at least a part of an advertisement beyond which a multimedia device has fast-forwarded (usually in response to a user's command to fast-forward past that advertisement).

Sophisticated, modern multimedia devices, e.g., digital video recorders (DVRs), media players, personal computers, handheld devices (e.g., cellular phones, smart phones, tablets, etc.), etc., have the ability to play back multimedia content and allow the user to perform special effects functions including, but not limited to, any of: fast forward, variable rate fast forward, rewind, variable rate rewind, pause, frame stepping, slow motion play, or play functions. DVRs, for example, are capable of scheduling the recordings of programs that are to be broadcast at some time in the future. If a DVR user is interested in recording all episodes of a televised series, then the DVR user can instruct his DVR to get a "season pass" for that series. In response to such an instruction, the DVR automatically determines, from, for example, electronic programming guide ("EPG") data, times at which episodes of that series are going to be televised in the future. Typically, whenever an episode of the selected series is about to be broadcasted, the DVR automatically tunes to the channel on which the episode is going to be broadcasted and records that episode on the DVR's at least one storage device. For as long as the recorded episode remains on the DVR's storage device, the DVR's user can instruct the DVR to play the episode to the user's television. Conveniently, this allows the DVR user to watch programs in which the user is interested at times other than those programs' broadcasting times. The DVR user does not even need to know, beforehand, the exact times at which those programs are going to be broadcasted.

As used herein, a "program" is any content, visual and/or audible, that is presented through a display system's display and/or speakers. For example, a program might be an episode of a multi-episode series, a movie, a sporting event, or a news presentation, although this is not an exclusive list of "programs." When a DVR schedules a program for future recording, the DVR attempts to add the program to a recording schedule that the DVR maintains within the DVR's own storage mechanisms. Whenever a program on the DVR's recording schedule is broadcasted or available, the DVR automatically records that program.

When a user wants a DVR to fast-forward entirely past a recorded commercial break so that the user can view (at normal playback speed) a next program interval of a recorded program that the user was watching, the user will usually attempt to instruct the DVR to stop fast-forwarding, and begin playing at normal speed, at the moment that the user detects that the commercial break has ended. However, human reaction times are relatively slow. As a result, by the time that the user is able to detect that the DVR has fast-forwarded past the end of the commercial break, the DVR has already fast-forwarded into at least a portion of the program interval that follows the commercial break. Because a typical user does not want to miss viewing any part of the program interval, the user will then instruct the DVR to rewind the recorded content from that point in the recorded content stream in order to adjust to the beginning of the portion of the program. As the DVR is rewinding the recorded content, the typical user will watch what is being displayed and attempt to detect the precise beginning of the program interval that follows the commercial break. When the user visually detects that point, the user instructs the DVR to begin playing the recorded content forward at normal speed.

According to one embodiment of the invention, while a DVR is fast-forwarding through content (which may include advertisement content and program content), the DVR reads in-band tags or in-band data used to look up tag information whose presence is expressed in or otherwise derived from information that is contained in, for example, a closed-caption or private data stream that is associated with the content. According to one embodiment of the invention, an advertiser pays, to a DVR service, a fee in exchange for having the DVR service cause DVRs to recognize the presence of a particular tag at a specified point in the content stream. The specified point may be in a commercial break or a program interval, for example. When the DVR detects the presence of the particular tag while fast-forwarding, the DVR enters a special state. According to one embodiment of the invention, any time that the DVR is in this special state, if the DVR detects that the user has instructed the DVR to stop fast-forwarding (e.g., due to the user instructing the DVR to begin playing content at normal speed or to begin rewinding content), the DVR locates a specified temporal location in a recorded commercial break. This specified temporal location may be specified by the particular tag, for example. Typically, the specified temporal location occurs within or at the beginning of an advertisement of the advertiser that paid the fee to the DVR service, and is chosen by that advertiser. The DVR stops performing whatever activity in which the DVR was engaged, "jumps back" to the specified temporal location in the recorded commercial break, and resumes playing the recorded content stream at normal speed from the specified temporal location.

In one embodiment of the invention, the DVR remains in the special state until at least a specified amount of time has passed since the DVR "jumped back" to the specified temporal location, after which the DVR exits the special state. Usually, the specified amount of time is equal to the amount of time that will be required to play at least a portion of the advertisement in which the specified temporal location occurs. In such an embodiment of the invention, after the DVR has "jumped back" and while the DVR remains in the special state, the set of commands that the DVR will accept from the user is limited in some way (e.g., the DVR might ignore user commands to fast forward or pause). Thus, in one embodiment of the invention, a DVR user that instructs the DVR to fast-forward past a commercial break is forced to watch at least a portion of an advertisement that occurs during that commercial break before the user can resume watching a program that follows the commercial break.

In other aspects, embodiments of the invention encompass a computer apparatus and a computer-readable storage medium configured to carry out the foregoing technique.

2.0 Structural Overview

Figure 2A:
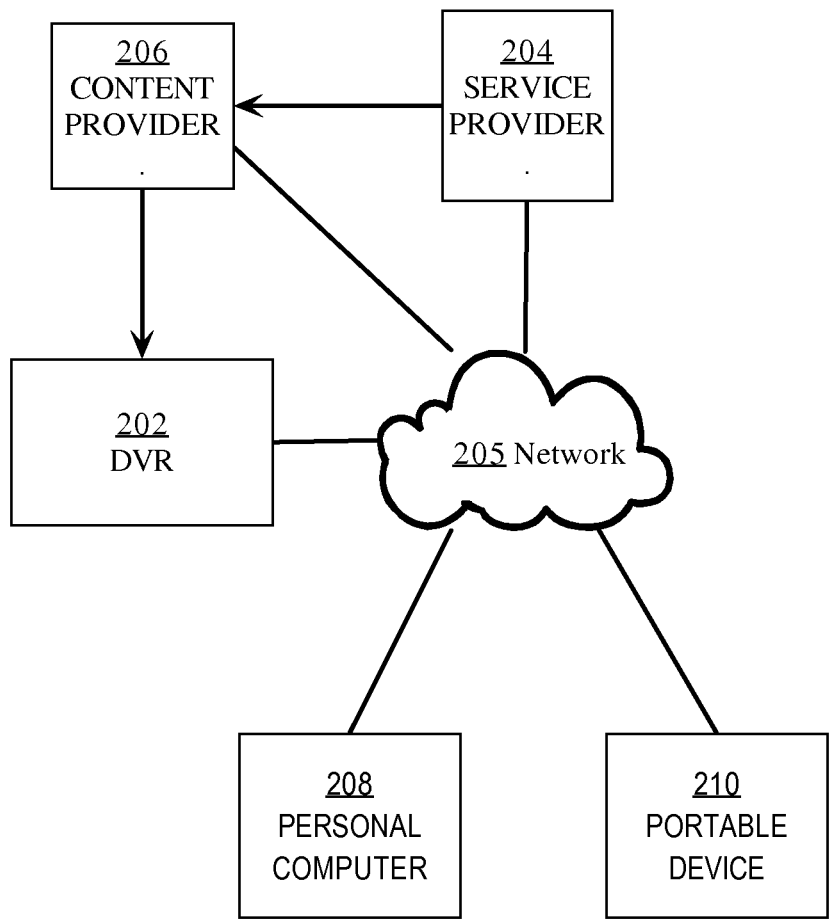
FIG. 2A illustrates an example system for automatically playing a recorded advertisement beyond which a multimedia device has fast-forwarded, according to an embodiment.

FIG. 2A illustrates an example system for automatically playing an advertisement or content beyond which a multimedia device, such as a DVR, has fast-forwarded past, according to an embodiment. The system contains at least one client multimedia device such as DVR 202 which is communicatively coupled to network 205 through any communication interface, such as an Ethernet interface or wireless communications port. The functionality of a DVR is typified in U.S. Pat. No. 6,233,389, which is owned by the Assignee and is hereby incorporated by reference. The system also includes service provider 204, content provider 206, personal computer 208 and portable device 210.

Personal computer 208 may be a personal computing device, such as a desktop computer or laptop computer, and is also coupled to network 205 through any communications interface, including wireless. Portable device 210 may be any handheld computing device, cellular phone, portable media player, or any other portable device capable of displaying multimedia content and may be coupled to network 205 through any communications interface, including wireless. DVR 202, personal computer 208, and portable device 210 each communicate with service provider 204 through network 205. In another embodiment, DVR 202, personal computer 208, and portable device 210 each communicate with content provider 210 through network 205.

Network 205 may be implemented by any medium or mechanism that provides for the exchange of data between devices in the communication system. Examples of network 205 include, without limitation, a network such as a Local Area Network (LAN), Wide Area Network (WAN), the Internet, one or more terrestrial, satellite or wireless links, etc. Alternatively or additionally, any number of devices connected to network 205 may also be directly connected to each other through a communications link.

In one embodiment, content provider 206 provides broadcast program content to DVR 202 via cable, satellite, terrestrial communication, network, or other transmission method. Broadcast program content may include any multimedia content such as: audio, image, video content, etc. In another embodiment, content provider 206 provides multimedia content, such as any downloadable content, through network 205 to DVR 202, personal computer 208, or portable device 210.

In one embodiment, DVR 202 communicates with service provider 204, which provides, but is not limited to, any of: program guide data, graphical resources (such as fonts, pictures, brand icons, pictures, etc.), service information, software, advertisements, event identification data, other forms of data, etc., that enable DVR 202 to operate independently of service provider 204 to satisfy user interests, etc. In another embodiment, DVR 202, personal computer 208, and portable device 210 can communicate with each other to transfer content, metadata, or any other data through network 205, communication connection, or any local network.

In another embodiment, content provider 206 may provide, to service provider 204, content data or any metadata, including, but not limited to, any of: promotional data, icons, web data, or other information. Service provider 204 may then interpret the metadata and provide the content data metadata to DVR 202, personal computer 208, or portable device 210.

Figure 2B:
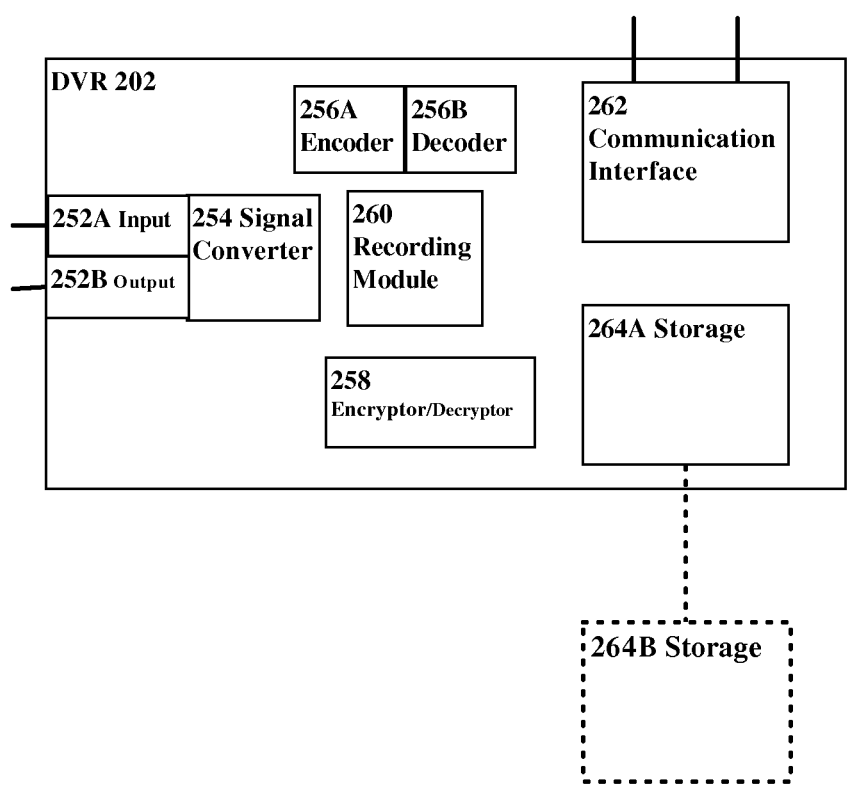
FIG. 2B is a block diagram illustrating a general overview of the components of a Digital Video Recorder (DVR), according to an embodiment of the invention.

Referring to FIG. 2B, in an embodiment, DVR 202 generally comprises a plurality of components, signified by Signal Converter 254, that are necessary to digitize an analog television signal and convert it into a digital data stream or accept a digital data stream. An example of the internal structure and operation of a DVR is further described in U.S. Pat. No. 6,233,389.

DVR 202 receives broadcast signals from an antenna, from a cable TV system, satellite receiver, etc., via input 252A. Input 252A may comprise a plurality of tuning modules that allow a plurality of signals to be received and recorded simultaneously. For example, a TV input stream received by input 252A may take the form of a National Television Standards Committee (NTSC) compliant signal or a PAL compliant broadcast signal. For another example, a TV input stream received by input 252A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. As another example, digital streams downloaded or streamed from a network may be in digital formats such as MPEG-2, MPEG-4, WMV, AVCHD, etc.

In an embodiment, an MPEG-2 transport multiplex supports multiple programs in the same broadcast channel with multiple video and audio feeds and private data. Input 252A tunes to a particular program in a channel, extracts a specified MPEG stream from the channel, and feeds the MPEG stream to the rest of the system. In an embodiment, input 252A downloads a digital stream from a source across the Internet and feeds the digital stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 252A and passed to the other modules as if the signals had been delivered via an MPEG-2 private data channel.

IN an embodiment, recording module 260 records the incoming data stream by storing the digital data stream on at least one storage facility, signified by Storage 264A/164B that is designed to retain segments of the digital data stream. Storage 264A/164B may be one or more non-volatile storage devices (e.g., hard disk, solid state drive, USB external hard drive, USB external memory stick, USB external solid state drive, network accessible storage device, etc.) that are internal 264A and/or external 264B. A Signal Converter 254 retrieves segments of the data stream, converts the data stream into an analog signal, and then modulate the signal onto a RF carrier, via Output 252B, through which the signal is delivered to a standard TV set. Output 252B may alternatively deliver a digital signal to a TV set or video monitor. For example, DVR 202 may utilize any of: a Digital Visual Interface port (DVI) for sending digital signals to a display monitor via a DVI cable, HDMI, VGA, etc.

DVR 202 also includes a Communication Interface 262, through which the DVR 202 communicates with Network 205 via Ethernet, wireless network, modem, or other communications standard. Further, DVR 202 may be integrated into a TV system such that the components described above are housed in a TV set capable of performing the functions of each component of DVR 202.

In another embodiment, DVR 202 generally comprises a plurality of components necessary to receive, record, store, transfer and playback digital data signals from a plurality of sources, such as, any of: a PC, a DVR, a service provider, content server, etc. DVR 202 can transfer digital data signals to another DVR or PC. DVR 202 may encode or decode digital signals via Encoder 256A and Decoder 256B into a plurality of formats for playback, storage or transfer. According to one embodiment of the invention, encoder 256A produces MPEG streams. According to another embodiment of the invention, encoder 256A produces streams that are encoded using a different codec. Decoder 256B decodes the streams encoded by encoder 256A or streams that are stored in the format in which the streams were received using an appropriate decoder. DVR 202 can also encrypt or decrypt digital data signals using Encryptor/Decryptor 258 for storage, transfer or playback of the digital data signals.

In one embodiment, DVR 202 communicates with Service Provider 204, which provides, but is not limited to, any of: program guide data, graphical resources (such as fonts, pictures, brand icons, pictures, etc.), service information, software, advertisements, event identification data, other forms of data, etc., that enable DVR 202 to operate independently of the Service Provider 204 to perform autonomous recording functions. Communication between DVR 202 and Service Provider 204 utilizes a secure distribution architecture to transfer data between the DVR 202 and the Service Provider 204 such that both the service data and the user's privacy are protected.

3.0 Playing a Skipped Advertisement

FIG. 1 is a flow diagram that illustrates an example of a technique for automatically playing an advertisement or content beyond which a multimedia device, such as a DVR, has fast-forwarded, according to an embodiment of the invention. In one embodiment of the invention, at least some of the steps of the illustrated technique are performed by the DVR shown in FIG. 2B. Alternative techniques, according to various alternative embodiments of the invention, may comprise fewer, greater, or different steps than those illustrated in FIG. 1.

Referring now to FIG. 1, in block 102, in an embodiment, a DVR service may enter into an agreement with an advertiser. The agreement states that the DVR service will cause DVRs under the DVR service's influence (e.g., DVRs to which the DVR service is capable of uploading information) to recognize the presence of one or more specified "jump back" tags that are either expressed in or derived from information that accompanies a content stream. For example, the specified "jump back" tags may be expressed in or derived from information that is contained in a closed-captioning or private data stream that accompanies a program and/or an advertisement that is going to be broadcasted in the future. The agreement may further state that, in exchange for the performance of these actions by the DVR service, the advertiser will pay the DVR service a specified fee or other valuable consideration.

In block 104, in an embodiment, in response to the entrance of the DVR service and the advertiser into the agreement or for general or specific configuration reasons, the DVR service instructs DVRs under the DVR service's influence to recognize the presence of one or more specified "jump back" tags for the advertiser at one or more points in a specific content stream or in any content stream. In an embodiment, the DVR service may, for example, instruct DVRs to ignore or recognize tags that contain certain identifiers (e.g., that indicate a specific advertiser, etc.) or recognize all tags.

For example, the DVR service may cause specified tag codes to be inserted into a closed-captioning or private data stream at a specified point. The codes may be of a type such that the codes will not be displayed along with other closed-captioning text, but such that the codes will be detectable by the DVRs. The data included in the tags may include any combination of: an indication of what type of tag it is, what action is to be performed (e.g., jump back time period, jump back timestamp, duration of time that certain user commands are ignored, user command to be ignored, user commands to be accepted, etc.), any icons that may be displayed, etc. An example technique for inserting DVR-detectable tags into a closed-captioning stream is disclosed in U.S. Pat. No. 7,889,964, titled "CLOSED CAPTION TAGGING SYSTEM," which is incorporated by reference for all purposes as though fully disclosed herein.

For another example, the DVR service may calculate patterns of hash values by feeding, into a hash function, closed-captioning text that occurs at (or close to) a specified point in the closed-captioning stream. The DVR service may upload, to the DVRs, a mapping (e.g., a list, a table, a portion of a database, etc.) between patterns of hash values and specified tag codes and information. Thereafter, the DVRs may feed received closed-captioning text into a hash function, detect when the point that corresponds to a specified resulting sequence of hash values matching a pattern of hash values specified by the DVR service has been reached in the closed-captioning stream, and treat the specified tag codes that are mapped to that hash value as though those specified tag codes were actually contained at that point in the closed-captioning stream (even though the closed-captioning stream does not actually contain the specified tag codes). An example technique for deriving the presence of a hash tag from information contained in a closed-captioning stream, without actually inserting any tag into the closed-captioning stream, is disclosed in U.S. Pat. No. 7,661,121, titled "IN-BAND DATA RECOGNITION AND SYNCHRONIZATION SYSTEM," which is incorporated by reference for all purposes as though fully disclosed herein.

For yet another example, the DVR service may generate a hash value by feeding, into a hash function, the actual content of the video frame (or a portion thereof) and/or the audio track that accompanies the video frame. In a manner similar to that discussed above, the DVR service may upload, to the DVRs, a mapping between this hash value and specified tag codes. Thereafter, the DVRs may feed video frame data and/or audio data into the hash function, detect when the point that corresponds to a specified resulting hash value has been reached in the video or audio content, and treat the specified tag codes that are mapped to that hash value as though those specified tag codes were actually contained at that point in the stream. Thus, tags may be derived from the appearance of specified objects in the recorded video stream, and/or from the existence of specified sounds in the accompanying audio track.

The points at which the presences of the "jump back" tags are to be recognized may occur in a commercial break in which the advertiser's advertisement is scheduled to be presented. Additionally or alternatively, the points at which the presences of the "jump back" tags are to be recognized may occur in (e.g., toward the beginning of) a program interval that follows such a commercial break. In one embodiment of the invention, any of: the advertiser, broadcaster, DVR service, etc., chooses the points in the closed-captioning stream at which the presence of "jump back" tags should be recognized by the DVRs.

In one embodiment of the invention, the tag codes specified in a "jump back" tag indicate at least (a) any of: a specified temporal location in the content stream, time stamp, amount of time, etc., to which the DVR should "jump back," and (b) an amount of time that the DVR should ignore at least some specified user commands after "jumping back" to the specified temporal location. The use of these tag code-specified values is discussed below.

In block 106, a DVR (e.g., one of the DVRs that the DVR service has instructed to recognize the presence of the "jump back" tags) begins to fast-forward recorded content in response to a user's command to do so. While the DVR is fast-forwarding the recorded content, the DVR observes any combination of: the closed-captioning stream, private data stream, etc., for the expressed or derived (e.g., from hash values, etc.) presence of "jump back" tags.

In block 108, while the DVR is fast-forwarding the recorded content, the DVR detects the expressed or derived presence of a "jump back" tag from the closed-captioning stream. In response to detecting the presence of the "jump back" tag, the DVR enters a special state in which the DVR continuously detects whether a user has instructed the DVR to stop fast-forwarding the recorded content (e.g., due to the user instructing the DVR to begin playing the recorded content at normal speed or to begin rewinding the recorded content).

In block 110, while the DVR is in the special state, the DVR detects that the user has instructed the DVR to stop fast-forwarding the recorded content. For example, the DVR may detect that the user has pressed the "play" button on the DVR's remote control.

In block 112, in response to detecting that the user has instructed the DVR to stop fast-forwarding the recorded content, the DVR locates, in the recorded content, a specified temporal location that was specified by the "jump back" tag whose presence the DVR previously detected in block 108. The DVR instantly begins playing recorded content beginning at this specified temporal location in the content stream. In one embodiment of the invention, the temporal location to which the DVR should "jump back" in the recorded content is previously selected by any of: the advertiser, broadcaster, DVR service, etc., and may be indicated within the tag or in the information associated with the tag. In an embodiment, the specified temporal location occurs at the beginning of, or somewhere within, an advertisement of the advertiser that entered into the agreement discussed above in connection with block 102. While the DVR remains in the special state, the DVR determines whether a specified amount of time has passed since the DVR jumped back to the specified temporal location. In one embodiment of the invention, this amount of time is specified by the "jump back" tag whose presence the DVR previously detected or derived in block 108.

In one embodiment of the invention, after the DVR has detected an exit from fast-forwarding mode as discussed above with reference to block 110, the set of commands that the DVR will accept from the user is limited in some way (e.g., the DVR might ignore user commands to fast-forward or pause). In one embodiment of the invention, as long as the DVR remains in the special state after detecting the exit from fast-forwarding mode, the DVR ignores all commands received from the user.

In block 114, in response to determining that a specified amount of time has passed since the DVR jumped back to the specified temporal location in block 112, the DVR exits the special state into which the DVR entered in block 108. As is mentioned above, in one embodiment of the invention, this amount of time is specified by the "jump back" tag whose presence the DVR previously detected in block 108. In one embodiment of the invention, the amount of time is chosen by any of: the advertiser, broadcaster, DVR service, etc., and can be selected to be long enough to cover the duration of the advertisement (or portion thereof) that the advertiser, broadcaster, DVR service, etc., wants the DVR user to view. In one embodiment of the invention, in which the advertisement is the last advertisement in the commercial break that precedes the program interval to which the user fast-forwarded, the DVR exits the special state when the ending of the commercial break and the beginning of the program interval is reached. The DVR may detect the ending of the commercial break by looking for one or more black frames in the recorded content, hashing of video frames using fingerprints, closed caption data, etc., for example. If the DVR limited the set of acceptable user commands previously, then the DVR begins to accept the previously unacceptable user commands after exiting the special state.

Although an embodiment of the invention described above involves jumping back to a specified location in a content stream (e.g., recorded, live, streamed, etc.), other embodiments of the invention may alternatively involve jumping forward to a specified location in a content stream. Yet other alternative embodiments of the invention may involve the DVR performing some other action in response to detecting the tag as discussed above, such as playing content that is stored on the DVR's at least one storage device, but which is not actually contained in the recorded content stream. Additionally, although an embodiment of the invention described above involves jumping to a specified location in order to cause a recorded advertisement at that location to be played, other embodiments of the invention may alternatively involve jumping to a specified location for purposes other than playing a recorded advertisement.

As is mentioned above, in one embodiment of the invention, the DVR service and the advertiser enter into the agreement that induces the DVR service to instruct DVRs to recognize the advertiser's tags and to jump back to the advertiser's advertisements when those advertisements are skipped. In one embodiment of the invention, the DVR service charges the advertiser a fee for causing the DVRs to behave in this manner. In another embodiment of the invention, the DVR service charges the advertiser a fee every time that the DVR service determines that a DVR has jumped back and played one of the advertiser's advertisements—the DVRs can be configured to report these events (e.g., over the Internet) to the DVR service. In an embodiment, DVRs may report back to the DVR service any operational data such as any of: which tags were fully executed, which tags were aborted while being executed (e.g., by a channel change, etc.), etc.

Although embodiments of the invention are described above with reference to DVRs, alternative embodiments of the invention may involve multimedia devices other than DVRs. For example, a portable memory device that is capable of storing and replaying recorded content may be used in a similar manner in one embodiment of the invention. Such a portable memory device may obtain content from any combination of: the Internet, a cable television signal, from a satellite television signal, through an HDMI from a computer or a DVR, etc., for example.

In one embodiment of the invention, a tag specifies, in addition to other possible information, an amount of time (or a number of frames, specific timestamp, etc.) that the tag is valid beyond the temporal location at which the tag occurs. In such an embodiment of the invention, when the DVR user stops fast-forwarding (as described above with reference to block 110 of FIG. 1) while the DVR is in the special state, the DVR determines whether the amount of time (or the number of frames, specific timestamp, etc.) that would have been required to play the segment of the recorded content that occurred between (a) the tag's location and (b) the point at which fast-forwarding stopped is greater than the tag-specified amount of time (or number of frames). If so, then the tag is ignored, and the DVR does not jump back to the tag-specified point in the recorded stream; under such conditions, the user is deemed to have skipped too much content to justify sending the user back to view the advertisement. Otherwise, the DVR jumps back to the tag-specified point in the recorded stream, in the manner described above.

In one embodiment of the invention, if a tag is ignored in the manner discussed above because the user-fast forwarded far beyond the temporal region in which the tag was supposed to be valid, and if the user subsequently rewinds the recorded content, and then stops the rewinding operation within the temporal region at which the tag is valid (e.g., within the tag-specified amount of time, number of frames, timestamp, etc., beyond which the tag occurs), then the DVR jumps back to the tag-specified point in the recorded stream, in the manner described above. Under such circumstances, the user is deemed to have inadvertently overshot the point at which the user wanted to resume playing the recorded content at normal speed. The user is deemed to have rewound the recorded content back into the tag's temporal validity region solely in order to correct the overshoot. Because the user's aggregate actions under such circumstances appear to have been motivated by a desire to skip only the advertisement and to begin playing immediately after the commercial break, the DVR is justified in forcing the skipped advertisement to be played.

4.0 Implementation Mechanisms—Hardware Overview

Figure 3:
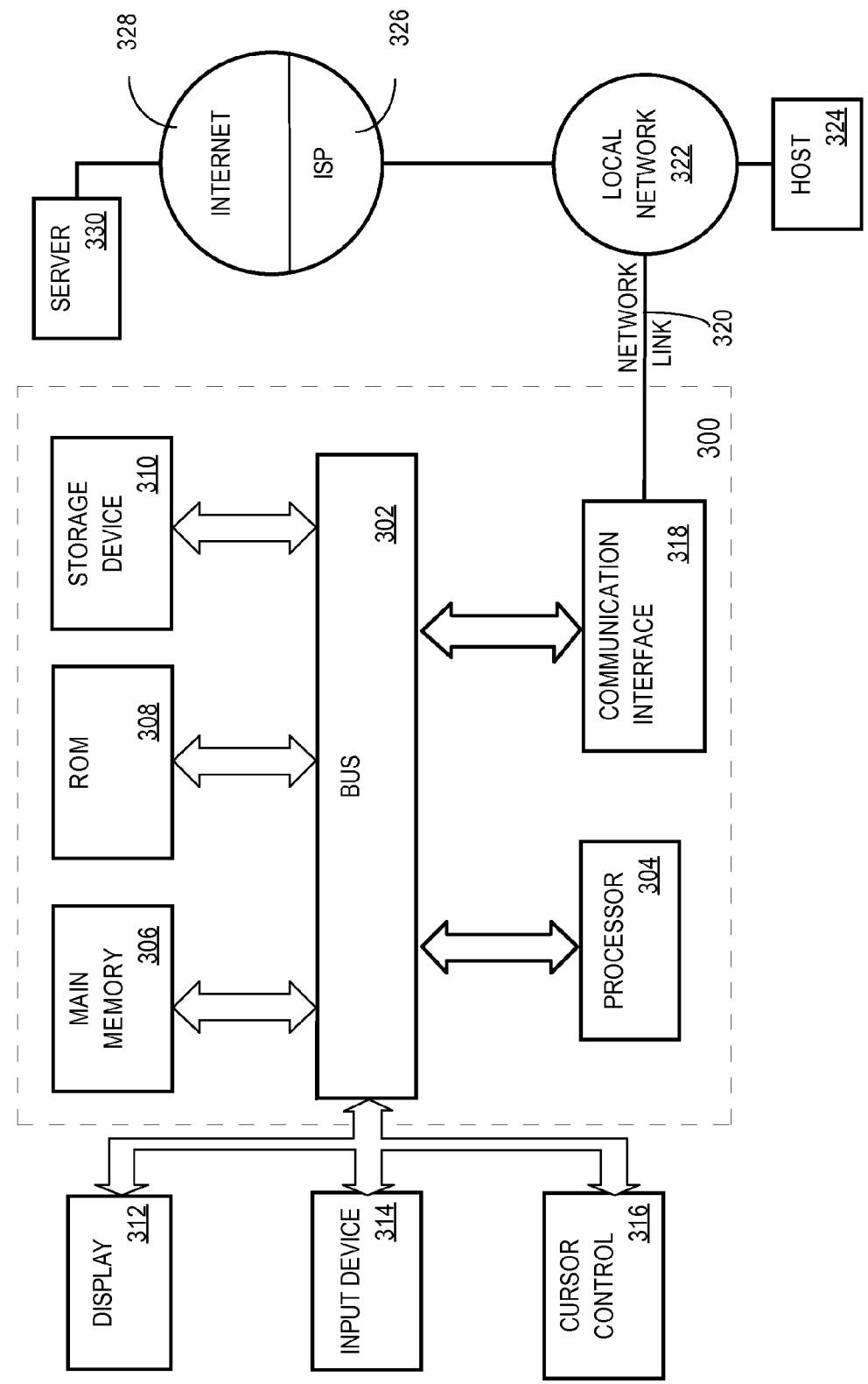
FIG. 3 is a block diagram that illustrates a digital video recorder upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT") or a liquid crystal display ("LCD"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for selecting a frame of a multi-frame video program for display in accordance with a selected trick play mode of a DVR. According to one embodiment of the invention, selecting a frame of a multi-frame video program for display in accordance with a selected trick play mode of a DVR is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   playing back, by a media device, content from a content stream at a normal playing speed;
   in response to the media device receiving a user command to fast forward the content from the content stream, fast forwarding, by the media device, the content from the content stream in a fast-forward mode;
   while the media device is fast-forwarding the content from the content stream in the fast-forward mode, detecting, by the media device, a presence of a particular tag from information associated with the content stream;
   exiting, by the media device, the fast-forwarding mode in response to the media device receiving a second user command to resume playing back the content from the content stream at the normal playing speed; and
   in response to exiting the fast-forwarding mode, performing:
      determining that a first amount of time required to play content from the content stream that occurs between (a) a location specified by the particular tag and (b) a point at which the fast-forwarding mode was exited is not greater than a second amount of time specified by the particular tag; and
      playing, by the media device, the content stream beginning at the location specified by the particular tag in response to determining that the first amount of time is not greater than the second amount of time;
   wherein the location is earlier than a point in the content stream where the fast-forwarding mode was exited.

2. The method of claim 1, wherein the step of detecting the presence of the
   particular tag comprises:
   detecting a specified code that has been inserted into a closed-captioning stream that corresponds to the content stream.

3. The method of claim 1, wherein the step of detecting the presence of the
   particular tag comprises:
   calculating, a sequence of hash values from closed-captioning stream text that corresponds to the content stream, thereby producing a hash value sequence;
   determining whether the sequence of hash values corresponds to any pattern of hash values in a specified set of patterns of hash values associated with specific tags; and
   in response to determining that the sequence of hash values corresponds to a first pattern of hash values in the specified set of patterns of hash values, performing an action according to information associated with the first pattern of hash values.

4. The method of claim 1, wherein the step of detecting the presence of the
   particular tag comprises:
   inserting, into a hash function, video or audio data from the content stream, thereby producing a hash value;
   determining whether the hash value corresponds to any tag in a specified set of tags; and
   in response to determining that the hash value corresponds to a first tag in the specified set of tags, performing an action according to information associated with the first tag.

5. The method of claim 1, wherein the step of playing the content stream beginning at the location specified by the particular tag comprises:
   limiting a set of commands obeyed by a device that is playing the content stream beginning at the location until criteria specified by the particular tag have been satisfied.

6. The method of claim 1, wherein the step of playing the content
   stream beginning at the location specified by the particular tag comprises:
   ignoring fast-forward commands while playing the content stream beginning at the location until criteria specified by the particular tag have been satisfied.

7. The method of claim 1, wherein the step of playing the content
   stream beginning at the location specified by the particular tag comprises:
   limiting a set of commands obeyed by a device that is playing the content stream beginning at the location until a tag-specified amount of time has passed since the device started playing the content stream beginning at the location.

8. The method of claim 1, wherein the step of playing the content
   stream beginning at the location specified by the particular tag comprises:
   limiting a set of commands obeyed by a device that is playing the content stream beginning at the location until a black frame has been detected in the content stream.

9. The method of claim 1, wherein the step of playing the content
   stream beginning at the location specified by the particular tag comprises:
   completely playing an advertisement that begins at the location in the content stream, and preventing skipping of the advertisement while completely playing the advertisement.

10. A method, comprising:
    while fast-forwarding content from a content stream, detecting a presence of a particular tag from information associated with the content stream;
    in response to detecting the presence of the particular tag, entering a particular state;
    while in the particular state, detecting that a fast-forwarding mode has been exited;

in response to detecting, while in the particular state, that the fast-forwarding mode has been exited, determining that a first amount of time required to play content that occurs between (a) a location to which the particular tag corresponds and (b) a point at which the fast-forwarding mode was exited is greater than a second amount of time specified by the particular tag;

after detecting that the first amount of time is greater than the second amount of time, detecting that a rewinding operation has caused the content stream to be rewound to a location that is within a temporal region that is based on the first amount of time; and in response to detecting that the rewinding operation has caused the content stream to be rewound to the location, playing content from the content stream beginning at the location.

11. A non-transitory computer-readable medium storing instructions for causing one or more processors to perform steps comprising:

playing back, by a media device, content from a content stream at a normal playing speed;

in response to the media device receiving a user command to fast forward the content from the content stream, fast forwarding, by the media device, the content from the content stream in a fast-forwarding mode;

while the media device is fast-forwarding the content from the content stream in the fast-forwarding mode, detecting, by the media device, a presence of a particular tag from information associated with the content stream;

exiting, by the media device, the fast-forwarding mode in response to the media device receiving a second user command to resume playing back the content from the content stream at the normal playing speed; and in response to exiting the fast-forwarding mode, performing:

determining that a first amount of time required to play content from the content stream that occurs between (a) a location specified by the particular tag and (b) a point at which the fast-forwarding mode was exited is not greater than a second amount of time specified by the particular tag; and playing, by the media device, the content stream beginning at the location specified by the particular tag in response to determining that the first amount of time is not greater than the second amount of time;

wherein the location is earlier than a point in the content stream where the fast-forwarding mode was exited.

12. The computer-readable medium of claim 11, wherein the step of detecting the presence of the particular tag comprises:

detecting a specified code that has been inserted into a closed-captioning stream that corresponds to the content stream.

13. The computer-readable medium of claim 11, wherein the step of detecting the presence of the particular tag comprises:

calculating, a sequence of hash values from closed-captioning stream text that corresponds to the content stream, thereby producing a hash value sequence;

determining whether the sequence of hash values corresponds to any pattern of hash values in a specified set of patterns of hash values associated with specific tags; and in response to determining that the sequence of hash values corresponds to a first pattern of hash values in the specified set of patterns of hash values, performing an action according to information associated with the first pattern of hash values.

14. The computer-readable medium of claim 11, wherein the step of detecting the presence of the particular tag comprises:

inserting, into a hash function, video or audio data from the content stream, thereby producing a hash value;

determining whether the hash value corresponds to any tag in a specified set of tags; and in response to determining that the hash value corresponds to a first tag in the specified set of tags, performing an action according to information associated with the first tag.

15. The computer-readable medium of claim 11, wherein the step of playing the content stream beginning at the location specified by the particular tag comprises:

limiting a set of commands obeyed by a device that is playing the content stream beginning at the location until criteria specified by the particular tag have been satisfied.

16. The computer-readable medium of claim 11, wherein the step of playing the content stream beginning at the location specified by the particular tag comprises:

ignoring fast-forward commands while playing the content stream beginning at the location until criteria specified by the particular tag have been satisfied.

17. The computer-readable medium of claim 11, wherein the step of playing the content stream beginning at the location specified by the particular tag comprises:

limiting a set of commands obeyed by a device that is playing the content stream beginning at the location until a tag-specified amount of time has passed since the device started playing the content stream beginning at the location.

18. The computer-readable medium of claim 11, wherein the step of playing the content stream beginning at the location specified by the particular tag comprises:

limiting a set of commands obeyed by a device that is playing the content stream beginning at the location until a black frame has been detected in the content stream.

19. The computer-readable medium of claim 11, wherein the step of playing the content stream beginning at the location specified by the particular tag comprises:

completely playing an advertisement that begins at the location in the content stream, and preventing skipping of the advertisement while completely playing the advertisement.

20. A non-transitory computer-readable medium storing instructions for causing one or more processors to perform steps comprising:

while fast-forwarding content from a content stream, detecting a presence of a particular tag from information associated with the content stream;

in response to detecting the presence of the particular tag, entering a particular state;

while in the particular state, detecting that a fast-forwarding mode has been exited;

in response to detecting, while in the particular state, that the fast-forwarding mode has been exited, determining that a first amount of time required to play content that occurs between (a) a location to which the particular tag corresponds and (b) a point at which the fast-forwarding mode was exited is greater than a second amount of time specified by the particular tag;

after detecting that the first amount of time is greater than the second amount of time, detecting that a rewinding operation has caused the content stream to be rewound to a location that is within a temporal region that is based on the first amount of time; and in response to detecting that the rewinding operation has caused the content stream to be rewound to the location, playing content from the content stream beginning at the location.

\* \* \* \* \*